United States Patent [19]

Hrusecky et al.

[11] Patent Number: 5,303,176
[45] Date of Patent: Apr. 12, 1994

[54] HIGH PERFORMANCE ARRAY MULTIPLIER USING FOUR-TO-TWO COMPOSITE COUNTERS

[75] Inventors: David A. Hrusecky, Johnson City; James E. Phillips, Binghamton; Stamatis Vassiliadis, Vestal, all of N.Y.

[73] Assignee: International Business Machines Corporation, Armonk, N.Y.

[21] Appl. No.: 916,937

[22] Filed: Jul. 20, 1992

[51] Int. Cl.[5] .................................................. G06F 7/52
[52] U.S. Cl. ........................................................ 364/759
[58] Field of Search ............... 364/759, 757, 760, 758, 364/754

[56] References Cited

U.S. PATENT DOCUMENTS

| | | | |
|---|---|---|---|
| 4,228,520 | 10/1980 | Letteney et al. | 364/760 |
| 4,752,905 | 6/1988 | Nakagawa et al. | 364/760 |
| 4,769,780 | 9/1988 | Chang | 364/760 |
| 4,926,371 | 5/1990 | Vassiliadis et al. | 364/760 |
| 5,072,419 | 12/1991 | Zyner | 364/758 |
| 5,101,372 | 3/1992 | Heaslip | 364/758 |

Primary Examiner—Long T. Nguyen
Attorney, Agent, or Firm—Lynn L. Augspurger

[57] ABSTRACT

An apparatus for the reduction of partial products of a multiplier combines attributes of pre-addition and the regularity found in array multipliers by employing improved four-to-two composite counter cells. This composite counter cell, the basic block for reducing the partial products, is itself comprised of two new four-to-two counters. One of the four-to-two counters is used to perform pre-addition of the partial products while the second counter is used to perform addition between the sum produced by the counter performing the pre-addition and the outputs from the second counter of a cell in a previous stage of the addition. The regularity of array multiplication schemes is preserved and interconnections required by the mechanism span no more than two columns of the matrix.

5 Claims, 5 Drawing Sheets

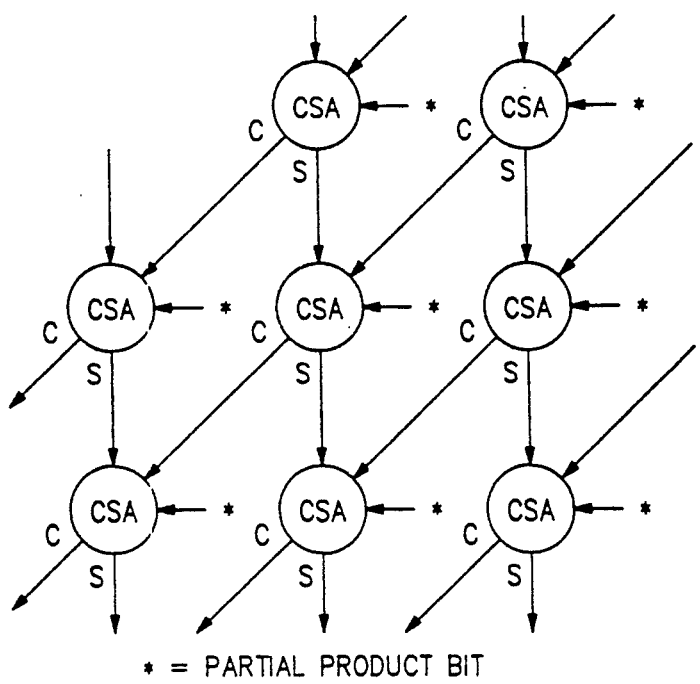
\* = PARTIAL PRODUCT BIT
FIG.1
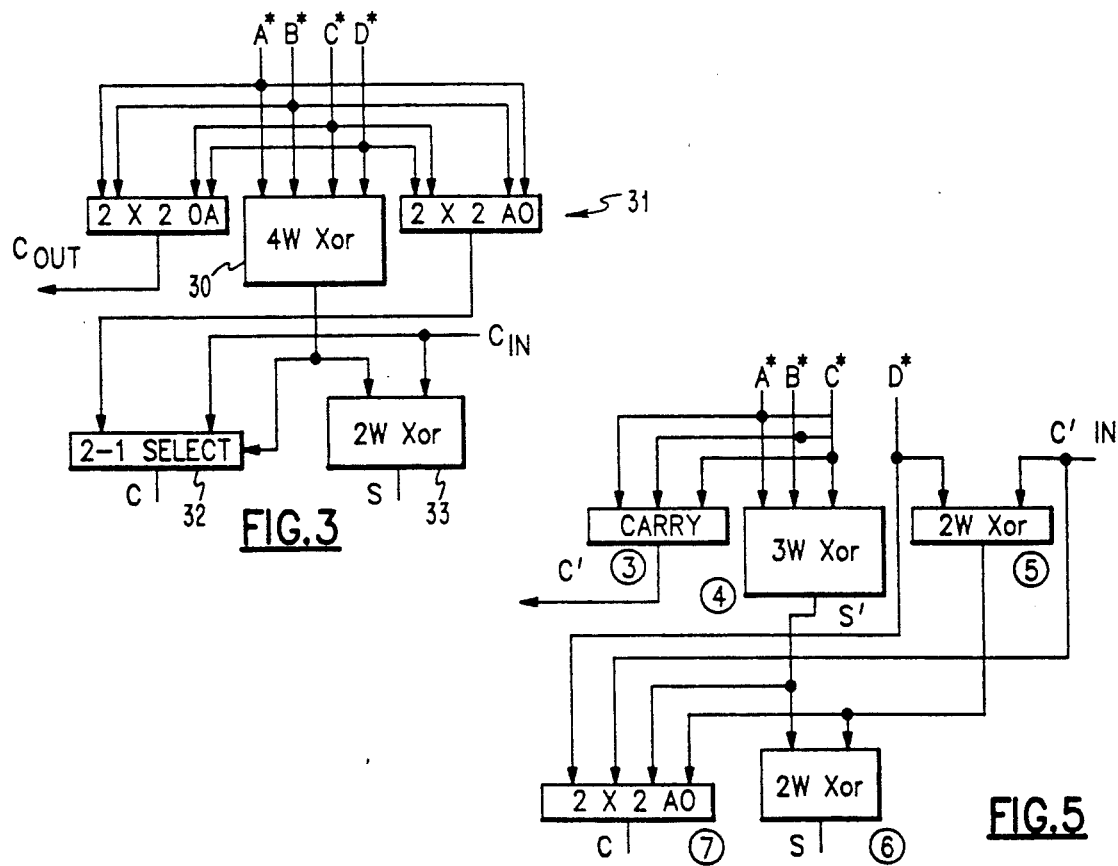
FIG.3
FIG.5

HIGH PERFORMANCE ARRAY MULTIPLIER USING FOUR-TO-TWO COMPOSITE COUNTERS

FIELD OF THE INVENTION

This invention relates to computing apparatus for parallel multipliers and particularly to the reduction of a plurality of partial products to two, which can be added by conventional means to produce the result. In particular, a new mechanism for the reduction of partial products of a multiplier is described utilizing techniques of pre-addition of partial products and the regularity of array multipliers. The new composite counter cell is composed of two usages of a new four-to-two counter design. The composite four-to-two counter is applicable for achieving high performance partial product reduction and is therefore applicable to any design requiring high speed multipliers including high performance processors, digital signal processors, etc.

REFERENCES USED IN THE DISCUSSION OF THE INVENTION

During the detailed description which follows the following works will be referenced as an aid for the reader. These additional references are:
1. Booth algorithm described in K. Hwang, 'Computer Arithmetic Principles, Architecture, and Design', John Wiley & Sons, 1979.
2. Wallace or Dadda tree described in K. Hwang, 'Computer Arithmetic Principles, Architecture, and Design', John Wiley & Sons, 1979 and L. Dadda, 'Some Schemes for Parallel Multipliers', Alta Frequenza, Vol. 34, 349–356.
3. Nagamatsu et al. for S390 56×56 bit multiplier described in M. Nagamatsu, et. al., 'A 15-ns 32×32-b CMOS Multiplier with an improved Parallel Structure', IEEE Journal of Solid-State Circuits, Vol. 25, No. 2, pp 494–497, 1990.
4. Pezaris Array Multiplier Scheme described in S. D. Pezaris, 'A 40-ns 17-Bit Array Multiplier', IEEE Transactions on Computers, Vol. C-20, pp 442–447, 1971.
5. Baugh-Wooley Array Multiplier Scheme described in C. R. Baugh, et al., 'A Two's Complement Parallel Array Multiplication Algorithm', IEEE Transactions on Computers, Vol. C-22, pp 1045–1047, 1973.
6. Vassiliadis et al. Array Multiplier Scheme described in S. Vassiliadis, et al., 'Parallel Encrypted Array Multipliers', IBM Journal of Research and Development, Vol. 32, No. 4, 1988.

These additional references are incorporated by reference.

BACKGROUND OF THE INVENTION

Multiplication involves the production of partial products which may be produced either directly or indirectly, the reduction of the partial products to two values, and the subsequent addition of these two values by a two-to-one addition to produce the product. Assuming a carry-look-ahead two-to-one addition scheme, the speed of the multiplication is primarily influenced by the delay associated with the production of partial products, the number of partial products that must be reduced, and the delay associated with the reduction of these partial products to two values. For a given number of partial products, the delay associated with their reduction to two values is dependent upon the reduction technique and the counter chosen to implement the reduction.

The most common technique for indirect partial product production and assembly is the Booth algorithm since it is simple to implement, results in small delays for the production and assembly of multiples, and reduces the number of partial products. This is especially true when the three-bit algorithm is used in the design. Direct partial product generation and assembly also have been used. In the direct scheme, partial products are formed via a two-way AND between all combinations of the bits of the multiplicand and the multiplier with the weight of the partial product being determined by the weight of the bits being ANDed.

Two common techniques exist to reduce the partial products. The first scheme comprising either Wallace trees. or Dadda trees reduce the partial products in a parallel fashion by employing counters. Common counters used include three-to-two, five-to-three, and seven-to-three counters. Other counters may also be employed. The second technique involves the use of only three-to-two counters configured in a regular array to reduce the partial products. Both techniques have been employed extensively in the past. Their employment has been strictly based on the methodology used in the design rather than the advantages of one scheme versus the other. The parallel scheme has typically been employed in designs using a random logic methodology since less stages of logic are generally required to perform the reduction with this technique. This scheme, however, results in highly irregular structures that become difficult to place and wire. The second scheme requires more stages but is highly regular so that placement and wiring is relatively straight forward. As a result, this scheme is normally employed in designs using custom or semi-custom design methodology. To avoid prohibitive wire crossing, the counters used in array configurations have been limited to three-to-two counters as shown in FIG. 1.

In the past, multipliers generally have either employed the Booth algorithm for partial product generation in conjunction with either a Wallace or Dadda tree for partial product reduction or direct generation of partial products with array reduction of the resulting partial products using three-to-two CSAs. In this paper, a scheme for array reduction of partial products is presented that is not only suitable for use with the direct method, but is also useable in a hybrid approach where the partial product generation and assembly is performed using a Booth Algorithm while their reduction is accomplished by the array reduction scheme. A hybrid scheme is shown in FIG. 2 as applied to a S390 56×56 bit multiplier. (We will show how this hybrid apparatus can become an improved computing apparatus) As shown in this figure, a Booth encoder, implementing three-bit overlapped scanning, is used to produce 29 partial products that must be reduced to two values before entering the two-to-one adder. It is convenient to halve the resulting matrix of partial products before starting the reduction. This halving produces two matrices of 14 and 15 products that must be reduced. Though the following discussion uses this multiplier as an environment for presenting the concepts of the new reduction scheme, application of the concepts is not restricted to this environment.

As indicated above, m/n counters have been previously proposed and used for parallel reduction of the partial product matrix. A specific example uses the four-to-two counter shown in FIG. 3 to reduce, in a parallel fashion, the matrix of partial products of a 32×32 bit multiplier. While such counters may result in an advantage when compared with partial product reduction using three-to-two carry save adders, CSA, in a Wallace or Dadda reduction, they are unsuitable for regular array implementations. For example, consider the employment of the four-to-two counter shown in FIG. 3 to reduce a matrix of partial products using an array configuration. Because the number of relatively slow outputs, two, from this counter, C and S, exceeds the number of inputs, one, into the counter that are associated with relatively less critical paths, $C_{in}$, at least one slow output from a preceding four-to-two counter will of necessity be wired to an input of the subsequent counter that must traverse its critical path. This can be seen in FIG. 4, where one of the slowest outputs, C, has been wired to the input whose path is the fastest, $C_{in}$, leaving the slow output, S, to traverse the critical delay path. For this reason, the critical path through the counters performing the reduction is additive implying that the employment of such a counter in the array multiplier may not produce a speed advantage when compared with an array multiplier comprised of three-to-two CSAs. For example, the interconnections just described and shown in FIG. 4 indicate that each level of four-to-two counter reduces two products of the form $a_i b_i$, for a direct multiplication scheme, with the delay of a six-way XOR function. Given that the three-to-two CSA reduces a product term of the form $a_i b_i$ with a delay of a three-way XOR via the interconnection scheme employing these CSAs shown in FIG. 1, no apparent speed advantage results from the employment of the four-to-two counter array multiplier scheme since either approach reduces two partial product terms by employing a six-way XOR function.

In the sections to follow, we present a new counter design referred to as a four-to-two composite counter whereby four-to-two is intended to designate the reduction of four new items, i.e. partial products, to outputs that span no more than two multiplier columns. For example, the counter reduces four partial products of weight i while only requiring communication with columns of weight i and i+1. As a result of the limited communication required, interconnections between the composite counters can be kept small making the composite counters suitable for array multiplier schemes. Consequently, we incorporate the design into an array multiplier scheme, determine the associated critical path, and compare the proposed scheme with other known array implementation schemes.

SUMMARY OF THE INVENTION

It is an object of our invention to provide a computing apparatus for reducing a plurality of partial product to two that can be added by conventional means for producing results from a multiplication that can be used to design high performance parallel multipliers for use in processor designs, digital signal processor designs, special purpose digital signal processing applications, etc.

In accordance with our invention we provide a computing apparatus for use in a computing system having a conventional ALU for for producing results from a multiplication obtained by reducing partial products to two for input to the ALU. The partial product reduction device includes a basic building logic block, which is used in a cell having the basic building logic block for a pre-addition stage and a transmit addition reduction stage. Our invention of a high performance multiplication computing apparatus incorporates partial product reduction by means of a new four-to-two composite counter. The four-to-two composite counter achieves its performance by incorporating and appropriately connecting two usages of a new four-to-two counter designed for reducing the logic path delay. In addition, the four-to-two composite counter partial product reduction uses pre-addition and the regularity of array multipliers to improve the performance. The composite counter is connected in a manner that avoids the full brunt of the delay of the composite counter when reducing the partial products. Because the composite counter has been designed to be fast, this connection, avoiding the full brunt of this reduced delay, helps achieve very high performance partial product reduction.

Thus, for the reduction of partial products of a multiplier we combine attributes of pre-addition and the regularity found in array multipliers by employing improved four-to-two composite counter cells. This composite counter cell, the basic block for reducing the partial products, is itself comprised of two new four-to-two counters. One of the four-to-two counters is used to perform pre-addition of the partial products while the second counter is used to perform addition between the sum produced by the counter performing the pre-addition and the outputs from the second counter of a cell in a previous stage of the addition. The regularity of array multiplication schemes is preserved and interconnections required by the mechanism span no more than two columns of the matrix.

While the new four-to-two counters can be fabricated with standard chip production, the device is particularly suitable for a CMOS version which is presented. This enables us to provide a computing apparatus which processes the partial products of a multiplier with our improved partial product reduction array device which receives partial product terms and reducing a plurality of partial products to two. The reduced partial products are then supplied to an arithmetic logic unit coupled to said partial product reduction device, the reduction of partial products to two being added by said arithmetic logic unit for producing results from a multiplication that can be used for subsequent processing in the apparatus.

BRIEF DESCRIPTION OF THE DRAWINGS

FIG. 1 illustrates something that can be developed from the art in a 4-2 typical interconnection network for reduction of partial products in an array multiplier using three-to-two CSAs.

FIG. 3 illustrates a prior art four-to-two counter described by Nagamatsu et. al.

FIG. 5 shows our preferred embodiment of a four-to-two counter which we use in our computing apparatus as a basic building block for our composite 4-2 cell reduction logic.

FIG. 7 is represented as FIGS. 7A and 7B, and each composite four-to-two counter cell of FIG. 6 is replicated as an array portrayed in FIG. 7.

DETAILED DESCRIPTION OF THE PREFERRED EMBODIMENTS

Turning in more detail to the preferred embodiments, we will illustrate how they can be used. In FIG. 1 is shown a typical interconnection network for the reduction of partial products in array multipliers using three-to-two carry save adders (CSAs). This kind of using the kind of system of the prior art uses many elements, and is more expensive than the kind of system we describe.

Figure 2:
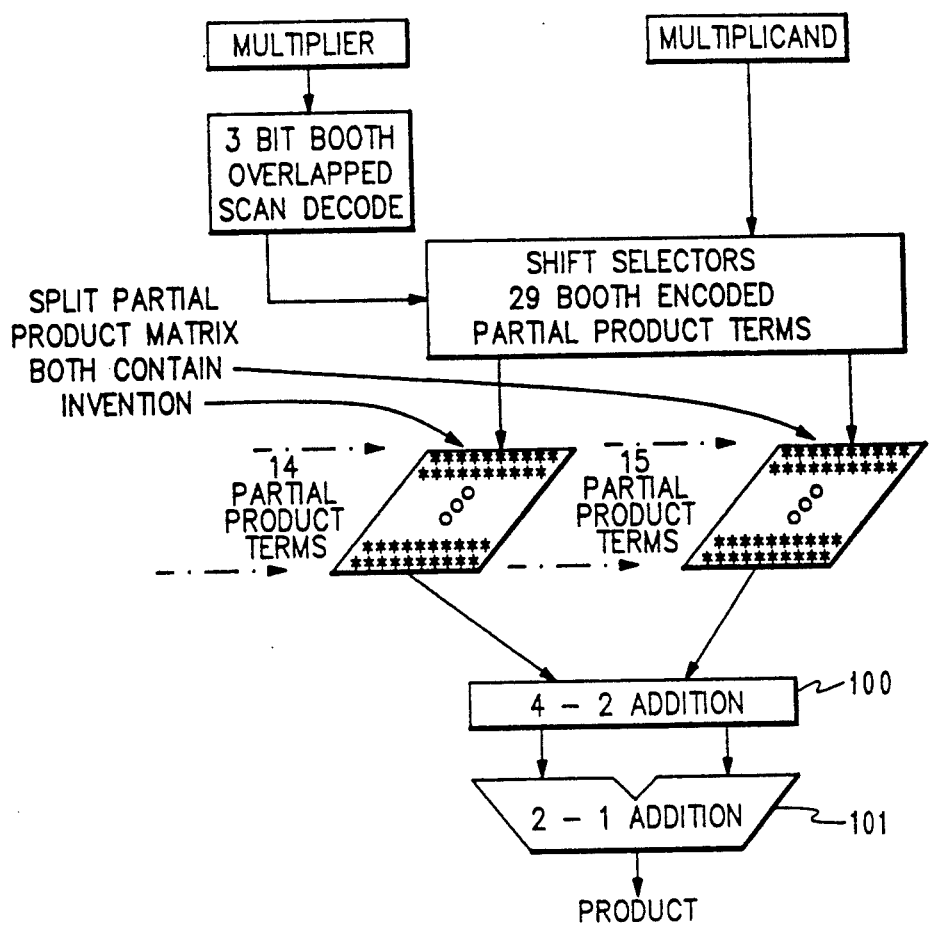
FIG. 2 illustrates how our invention can be used as a hybrid multiplier dataflow computing apparatus.

In FIG. 2 is shown a hybrid multiplier dataflow in which a Booth encoding scheme is assumed for producing a reduced number of partial products which are to be reduced by the split partial product matrix and the four-to-two addition to two partial products that must be added in a conventional manner to produce the result. Conventionally both a multiplier and a multiplicand are coupled to shift selectors to feed an adder. The multiplier as shown has a 3 bit Booth overlapped with a scan decode. The Shift selectors provide both encoded partial product terms to the adder to generate the product. Our preferred hybrid dataflow machine embodiment would add, as when in the FIG. 2 the array counters illustrated as 14 and 15 Partial Product Terms which have their output coupled to the 4-2 adder (binary adder 100), which then passes the result to the conventional 2-1 adder 101 to generate the product.

Figure 4:
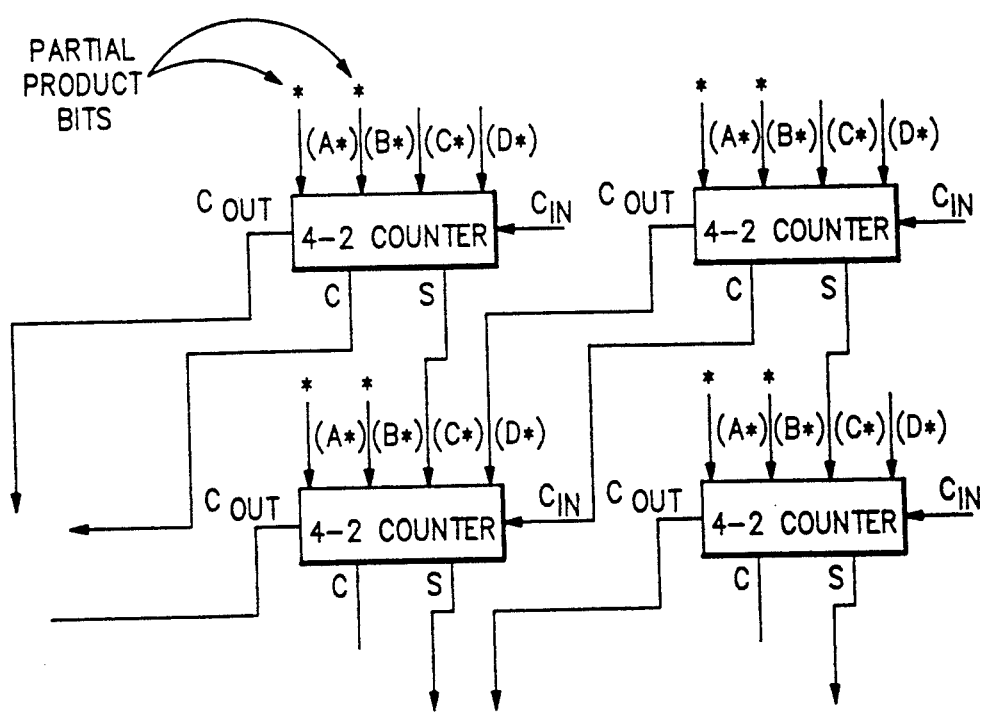
FIG. 4 shows employment of Nagamatsu's four-to-two counter in an array configuration.

In FIG. 3 is shown a four-to-two counter designed by Nagamatsu et. al. for use in multiplier partial product reduction. The Nagamatsu four-to-two counter had four inputs ($A^*, B^*, C^*, D^*$) to a 4 way XOR 30, and two $2 \times 2$ ($2 \times 2$ OA, and $2 \times 2$ AO) logic 31. The output of this logic 31 for the output of the $2 \times 2$ AO was provided to a 2-1 selector 32 which received a carry in signal, and the output of a 2 way XOR 33 to provide a carry and sum result respectively. The Nagamatsu design does not provide the features of our invention. In FIG. 4 shows the employment of Nagamatsu's four-to-two counter in an array configuration for effecting the reduction of partial products. It will be seen that there are many elements and lines between elements.

Having this background those skilled in the art will appreciate the advance we have made which utilizes, as shown in FIG. 5, a new four-to-two counter that is used by the current invention as a building block for the four-to-two composite counter. The reduction device is used in the computer apparatus as a part of the four-to-two composite cell computing apparatus we describe as our preferred embodiment. The computing apparatus in our system will have as illustrated in FIG. 2 an arithmetic logic unit (2-1 Addition). In addition using our building block, partial product terms will be reduced so that a plurality of partial products will be reduced to two (with the cell and 4-2 Addition) so that they will provide an input to the arithmetic logic unit. Our reduction matrix provides a plurality of composite four-to-two counter cells, each having a pre-addition reduction stage and a transmit addition reduction stage. Each stage has the building block shown in FIG. 5. It will be seen from FIG. 5 that our preferred counter has five blocks for reducing four inputs to two outputs. Blocks 3 and 4 of FIG. 5 effect the conventional CSA function by creating the sum, $S'$, and the carry, $C'$, associated with inputs $A^*, B^*$ and $C^*$. Because the delay incurred in producing the carry, $C'$, is smaller than that for producing the sum, $S'$, the carry from a reduction stage of an adjacent composite four to two counter cell can be fed into $C_{in}^*$ for producing a half-sum with a fourth input $D^*$ via the 2W-XOR of block 5. The resulting half-sum EXCLUSIVE-ORed with $S'$ then produces the sum S from the four-to-two counter. In parallel, the carry from the four-to-two counter, C, is produced from the $2 \times 2$ AO of block 7 using $S', D^*, C'_{in}$ and the result of block 5. In this manner, the delay incurred in the production of the result of block 5 is balanced with that for the production of $S'$ with the production of S constituting the longer delay through the counter, the production of C constituting an intermediate delay through the counter, and the production of $C'$ being sufficiently fast to allow its consumption in the same logic stage of reduction of the composite four to two counter cell as discussed above.

Figure 9:
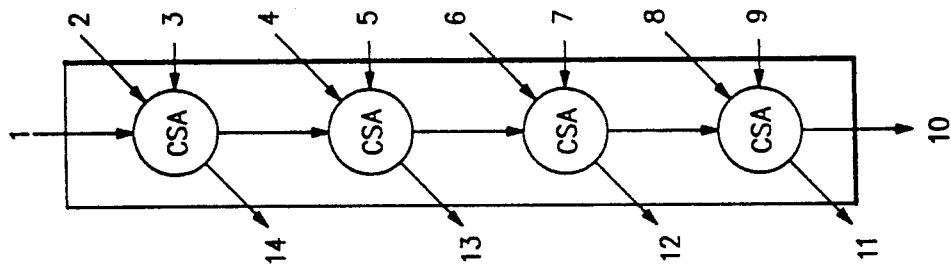
FIG. 9 illustrates an array network of 3-2 CSAs for reducing an identical number of partial products with our composite 4-2 Counter.
Figure 6:
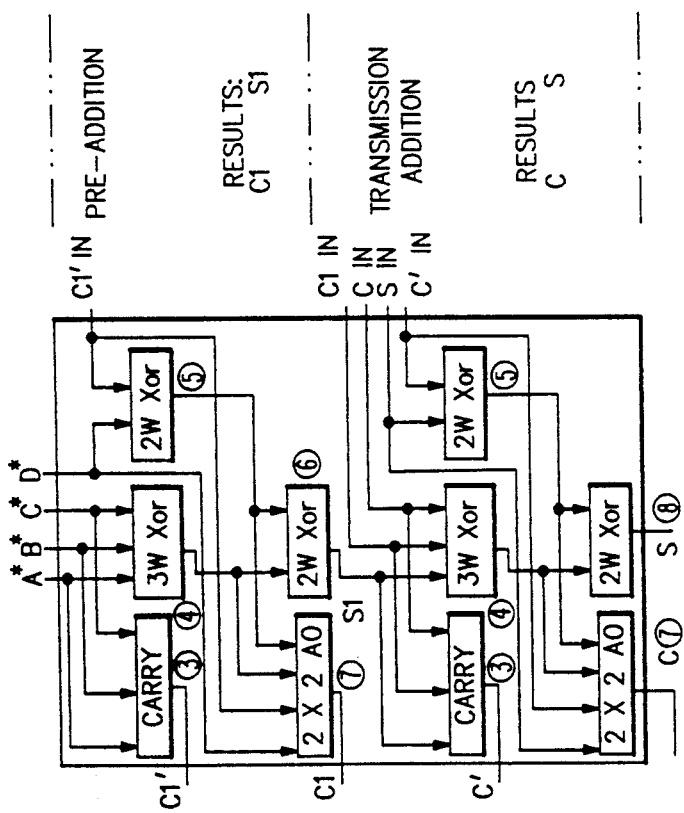
FIG. 6 shows our preferred composite four-to-two counter cell computer apparatus with reduction logic used in our preferred array multiplier.
Figure 8:
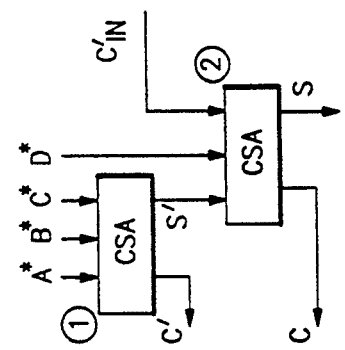
FIG. 8 shows our four-to-two counter represented as two cascaded carry-save-adders (CSAs).
Figure 7A:
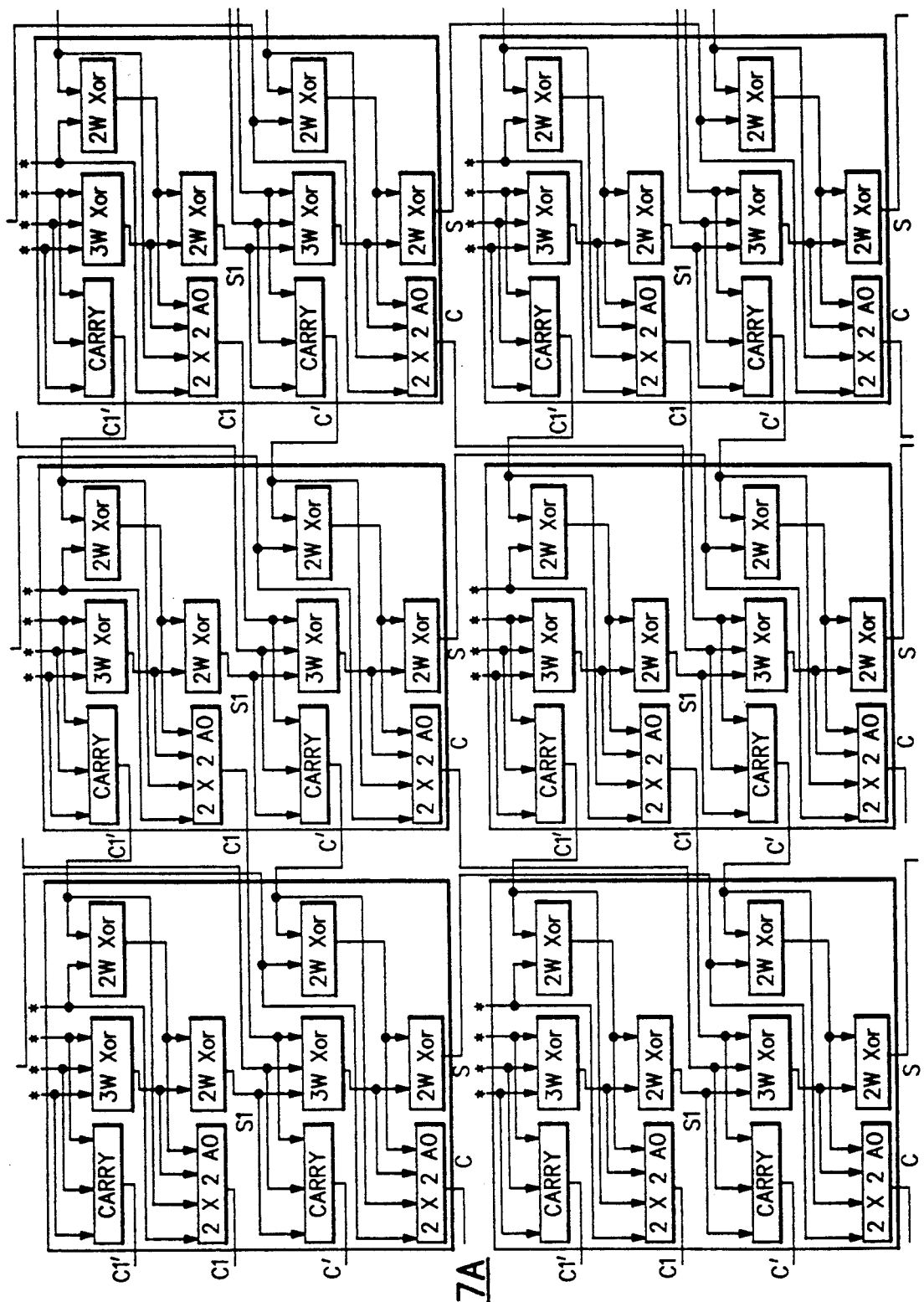
FIG. 7 shows our use of our composite four-to-two counter cell in an array multiplier, showing the array of cells.
Figure 7B:
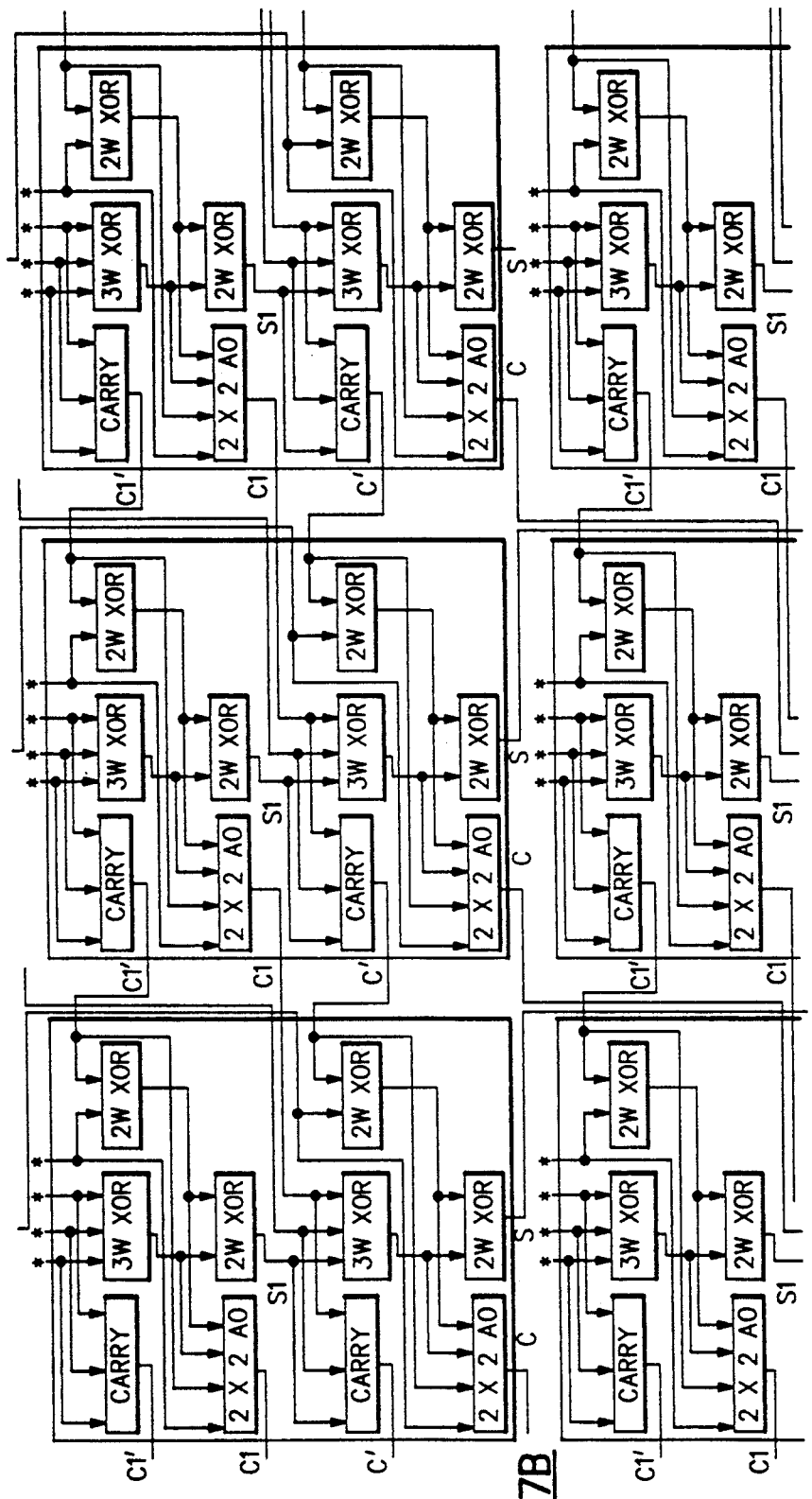
Figure 7:
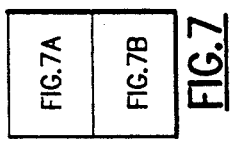

Before going into more detail, reference should be had to the following three drawings. In FIG. 6 (which shows two four-to-two counters which are like those of FIG. 5 as a first pre-addition counter stage and a second transmission addition counter stage) shows the incorporation of the new four-to-two counter design for constructing a four-to-two composite counter cell that is used to effect a new mechanism for reducing the partial products of a multiplier. In FIG. 7 shows a network incorporating the four-to-two composite counter cell to reduce a multipliers partial products to two. In FIG. 8 is shown a cascading of two CSAs whose function is equivalent to that of the new four-to-two counter. The cascaded CSAs are used to demonstrate the correctness of the new four-to-two counter design. And finally, FIG. 9 shows our array network of 3-2 CSAs for reducing identical numbers of partial products with our composite 4-2 counter.

For a counter to provide a speed advantage over the array multiplier employing three-to-two CSAs, the counter must reduce at least two partial products in less delay than a network of three-to-two CSAs producing an equivalent reduction in partial products. Some improvement can be obtained by making use of the four-to-two counter shown in FIG. 5. In this counter, the outputs from the counter, from slowest to fastest, are S, C, and $C'$. Only three of the five inputs, $A^*, B^*$, and $C^*$, as opposed to four inputs of FIG. 3, traverse the full delay of the counter while the remaining two inputs, $D^*$ and $C_{in}^*$ as opposed to one input of FIG. 3, avoid the full brunt of the counter delay. Therefore, the fastest output of a preceding counter, $C'$, can be wired to either $A^*, B^*$, or $C^*$ of a subsequent counter while the slower outputs S and C can be wired to inputs $D^*$ and $C_{in}'$. As a result, the delay through several stages of counters can be balanced.

Though some improvement is gained using the above counter, significant advantages over other schemes are not apparent. To achieve higher performance some other approach must be found for reducing a plurality of partial products without incurring the full delay of a CSA. Before turning to this mechanism, it should be noted that the partial products of the multiplication matrix are produced almost simultaneously despite the scheme used for their generation. Direct application of the above four-to-two counter designs, however, does not allow advantages of the simultaneous availability of the partial products to be fully exploited. Full exploitation of this property of multipliers requires pre-addition in which available partial products are reduced as the results of a preceding counter is being produced. This parallel reduction of the partial products must proceed independently of the results of the preceding counter. The above observations demonstrate that to fully realize the advantages of pre-addition requires more than a mere design of a four-to-two counter. It requires that a counter be dedicated to pre-addition along with an additional counter for reducing the outputs from pre-addition at adjacent counter cells. In addition, the number of inputs to the cell that by-pass the critical path must equal or exceed the total number of outputs of the pre-addition logic. Finally, the outputs of the cell should be produced in a manner that facilitates the wiring between the pre-addition logic of a producer cell with that of a cell consuming its outputs. A device that provides such capabilities is achieved by concatenating two of the four-to-two adders, described in FIG. 6, to produce a composite four-to-two counter. This composite cell is shown in FIG. 6. Cells comprised of the new four-to-two counter can be wired as shown in FIG. 7 to reduce four partial products without causing the rippling of carriers across the width of the multiplier. As a result, the sum from the second counter in the producing cell can be wired in a manner so that it traverses only a four-way XOR while reducing four partial product terms without causing the rippling of carries throughout the width of the multiplier. As a result, an identifiable speed advantage is obtained by building the composite cell from the new counter design.

If two 4-2 cells are cascaded as shown in FIG. 6, a "pre-addition" cell is produced that can be employed throughout the matrix. In this figure any input superscripted with an asterisk or star "*" designates inputs that are fed with partial product bits. All partial product bits input into any one pre-add cell are from the same column, i.e. they carry the same arithmetic weight. All other inputs are transmission signals from within the matrix, either from the previous "level" of pre-add cells, or from the current level.

The arrangement of these pre-add cells described above into a network for reducing the matrix of partial products into two values that can be added with a two-to-one CLA is shown in FIG. 7. Two advantages arise from the use of the composite counter. The first advantage is provided by the four-to-two counter dedicated to the pre-addition of partial products. All pre-additions can proceed in parallel so that only the first stage of composite counters incurs the full delay of the composite counter cell. In subsequent cells, the result of the pre-add is available and fed to the counter dedicated to reducing the results from the pre-add. The second advantage occurs due to the interconnections between composite cells which can be seen from the network shown in FIG. 7. From this network, it can be seen that the total worst case delay through the network is not the worst case delay path for the transmission portion of any one cell times the number of cell levels in the network. Such an ultimate worst case delay is avoided in that the output pin of the worst case delay for transmission through any one cell, is wired into an input on the next level that does not repeat the delay path just encountered. The total worst case delay through the second counter is composed of cell delays that "flip-flops" between the worst cell delay and some other faster path.

Proof of Correctness of Four-To-Two Counter

The four-to-two counter is designed to implement an identical function as two cascaded three-to-two adders arranged as shown in FIG. 8. To prove the correctness of the four-to-two counter, consider the following. First, the Carry block, block 3 in FIG. 5, produces C' by the well known expression for generating a carry in a three-to-two carry-save-adder (CSA). The three-way XOR, block 4, along with the two two-way XORs, blocks 5 and 6, produce the sum from the second of the cascaded three-to-two CSAs, block 2 of FIG. 8. The expression is $$S = A^* \forall B^* \forall C^* \forall D^* \forall C_{in}'$$

where $A^*$, $B^*$, $C^*$ and $D^*$ are the four inputs to the four-to-two counter and $C_{in}'$ is a carry produced by a four-to-two counter in the adjacent least significant bit position, LSB. Since S', the sum from the first of the cascaded three-to-two CSAs, block 1 of FIG. 8, is:

$$S' = A^* \forall B^* \forall C^*$$

the expression for S can be represented as $$S = S' \forall D^* \forall C_{in}'$$

which is the expression for the sum from block 2 of FIG. 8. It remains to be shown that the generation of C by blocks 4, 5, and 7 of FIG. 5 produce the carry that would be produced by block 2. The expression for C is:

$$\begin{aligned} C &= S'D^* + S'C_{in} + D^*C_{in} \\ &= S'D^*(C_{in} + C_{in}) + S'C_{in}(D^* + D^*) + D^*C_{in} \\ &= S'D^*C_{in} + S'D^*C_{in} + S'C_{in}D^* + S'C_{in}D^* + D^*C_{in} \\ &= S'(C_{in}D^* + C_{in}D^*) + S'C_{in}D^* + S'C_{in}D^* + D^*C_{in} \\ &= S'(C_{in} \forall D^*) + D^*C_{in} \end{aligned}$$

From FIG. 5 it can be observed that this expression is indeed implemented by blocks 4, 5, and 7.

Comparisons with Other Array Schemes

The proposed scheme can be validated by comparison with other well known array schemes. This comparison includes comparisons of I/O count, cell count, as well as the delay. First the I/O count and cell count are compared to those of an array reduction scheme utilizing three-to-two CSAs since this scheme is a prevalent scheme used in array multipliers possessing a simple and regular structure. Next, the delay of the proposed scheme is compared with the Pezaris scheme, the Baugh-Wooley scheme, and the Vassiliadis et al. scheme as these schemes claim to improve the performance for array reduction in multipliers.

The number of I/Os required by the composite four-to-two counter cell is larger than that for a three-to-two CSA. Direct comparison of the number of I/Os required for the four-to-two composite cell, however, with the number for a three-to-two CSA may be considered invalid because the CSA reduces only one partial product compared to the four reduced by the composite cell. Therefore, fewer four-to-two composite counter cells than CSA counters are required to obtain an equivalent reduction in partial product terms. In fact, when using a three-to-two CSA matrix to reduce partial products, four CSAs are needed to reduce an equivalent number of partial products as the composite cell. Four CSAs connected in an array is shown in FIG. 9. The number of I/Os required by this interconnection network is identical to the number of I/Os presented by the composite cell. As a result, an equivalent number of I/Os is required for both configurations.

Cell count estimates required by the proposed scheme and reduction using three-to-two CSAs should also be compared between logic that reduces an equivalent number of partial products. To reduce four partial products, the CSA network of FIG. 9 requires four three-way XORs and four 2×3 AO blocks. The composite cell also reduces four partial products using four two-way XORs, two 2×2 AOs, two carry blocks that perform a 2×3 AO function and two three-way XORs. By eliminating common blocks between the two structures, the difference between the schemes reduces to two three-way XORs and two 2×3 AOs for the CSA implementation versus two 2×2 AOs and four two-way XORs. Due to the disparity in the books contained in the delta, a conclusive comparison between the size required by the two schemes can not be made. Though the composite scheme appears to be slightly larger than the CSA scheme, the resulting difference would not appear to be prohibitive. This will become more apparent when the delay between the schemes is considered since the composite scheme clearly possesses a speed advantage as will be shown below.

We now turn to a comparison of the delay between the improved performance schemes enumerated above and the composite four-to-two counter scheme. The basis chosen for this comparison is the number of CSA delays, $\Delta$, required to reduce the array of partial products. The algorithms for the CSA delay of each of the schemes is:

| Scheme | Algorithm, n = number of partial product rows |
|---|---|
| Pezaris | $(n - 1)\Delta$ |
| Baugh-Wooley | $n\Delta$ |
| Vassiliadis et al. | $(n - 2)\Delta$ |
| Composite 4-2 counter | $4 + [\lceil n/4 \rceil - 1]2$ |

These algorithms have been applied to several common multiplier array sizes assuming direct production and assembly of partial products to produce Table 1 on page 17. In this table, the number of CSA delays, $\Delta$, is provided for each of the reduction schemes. The delay for only the reduction of the partial product matrix has been included in these delay calculations. In addition, for each of the Pezaris, Baugh-Wooley, and Vassiliadis et. al. schemes, the ratio of the partial product reduction delay for each of these schemes to the delay of the reduction scheme using the four-to-two composite counter is provided. From these comparisons, the advantage provided by the four-to-two composite counter should be evident. This advantage, though apparent, is understated as only the speedup due to pre-addition has been taken into account. The gain from avoiding the critical path of two CSAs in the inter-cell wiring associated with the composite four-to-two counter array scheme has been ignored since the amount of gain is technology dependent. The speedup associated with this latter advantage of the composite four-to-two counter array scheme, however, would not be insignificant making the comparison results for the delay pessimistic toward the proposed scheme. Therefore, the realized speedup from the four-to-two composite cell will be greater than that presented, whose speedup makes the marginal increase in area affordable.

TABLE 1

Comparison of Delay for Array Multiplier Schemes

| Size | Composite 4-2 Ctr Delay | Pezaris Delay | Ratio | Baugh-Wooley Delay | Ratio | Vassiliadis et. al. Delay | Ratio |
|---|---|---|---|---|---|---|---|
| 16 × 16 | 10 $\Delta$ | 15 $\Delta$ | 1.5 | 16 $\Delta$ | 1.6 | 14 $\Delta$ | 1.4 |
| 32 × 32 | 18 $\Delta$ | 31 $\Delta$ | 1.72 | 32 $\Delta$ | 1.78 | 30 $\Delta$ | 1.67 |
| 56 × 56 | 30 $\Delta$ | 55 $\Delta$ | 1.83 | 56 $\Delta$ | 1.87 | 54 $\Delta$ | 1.8 |
| 64 × 64 | 34 $\Delta$ | 63 $\Delta$ | 1.85 | 64 $\Delta$ | 1.88 | 62 $\Delta$ | 1.82 |
| 112 × 112 | 58 $\Delta$ | 111 $\Delta$ | 1.91 | 112 $\Delta$ | 1.93 | 110 $\Delta$ | 1.90 |
| 128 × 128 | 66 $\Delta$ | 127 $\Delta$ | 1.92 | 128 $\Delta$ | 1.94 | 126 $\Delta$ | 1.91 |

SUMMARY

Our partial product reduction array apparatus for computing having two four-to-two counters are combined to produce a composite four-to-two counter cell that improves the performance of reduction of the partial product matrix from a multiplier. The four-to-two composite cell achieves its performance by dedicating a four-to-two counter for pre-adding partial products of a multiplier matrix as a second four-to-two counter within the cell is used to reduce the results of a preceding pre-addition. The composite counter minimizes cell to cell communication. The resulting simplicity obtained for this cell to cell communication allows the composite counter to be utilized in an array reduction scheme. Comparisons between the Pezaris, Baugh-Wooley, and Vassiliadis et. al. schemes for multiplier widths between 16 and 128 bits indicate that the speedup for partial product reduction is at least from 1.4 to 1.92. For the more common 32 to 64 bit multipliers, the speedup is at least 1.67 to 1.85.

While we have described out preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A computing apparatus, comprising, input means for receiving a multiplier and a multiplicand and for supplying partial product terms of the multipler and multiplicand, a partial product reduction device for effecting partial product reduction of four partial products terms with a composite counter having a first pre-addition partial product addition counter stage and a second transmission partial product addition counter stage, the composite counter comprising two like four-to-two counter stages for pre-addition and for transmission addition, and wherein the like four-to-two counter stages each has five inputs, four of which are partial product terms and the other of which is a carry in, and wherein the first pre-addition partial product addition counter stage is a four-to-two counter having said five inputs, and having three outputs including a sum (S) at a weighted bit position (i), a second carry output (C) at a next adjacent weighted bit position for the more significant bit position (i−1) and a third carry output (C') provided to a next adjacent weighted more significant bit position (i−1);

said first pre-addition partial product addition four-to-two counter stage receiving the partial product terms and reducing the partial product terms to two which are coupled to an arithmetic logic unit;

said arithmetic logic unit coupled to said partial product reduction device, whereby the reduction of partial products to two is added by said arithmetic logic unit for producing results from a multiplication that can be used for subsequent processing in the apparatus.

2. The computing apparatus according to claim 1 wherein the transmission partial product addition counter stage has a four-to-two counter stage having five inputs and three outputs with one output carry coupled as one input of the same four-to-two counter stage to achieve a four-to-two counter.

3. The computing apparatus according to claim 2 wherein three of the five inputs of the counter of each addition counter stage incurs a longest delay penalty of the counter from input to output while the remaining two inputs incur a smaller delay penalty than that incurred by the previous three inputs.

4. The computing apparatus according to claim 3 wherein a counter sum output (S) at the weighted bit position i is produced after the longest delay, a second output (C) at the next adjacent weighted bit position $i-1$ is produced after an intermediate delay, and a third output (C') at the next adjacent weighted bit position $i-1$ is produced after a relatively short delay.

5. The computing apparatus according to claim 1 wherein the pre-addition counter and the transmission counter stages each have a four-to-two counter which has five inputs which are denominated $A^*$, $B^*$, $C^*$, $D^*$, $C'_{in}$, and has outputs produced which provide the output defined by the Boolean expressions:

$$S = S' \forall D^* \forall C_{in}$$

$$C = S'F + D^* C_{in}$$

$$C' = A^* B^* + A^* C^* + B^* C^*$$

where $$S' = A^* \forall B^* \forall C^*$$

$$F = D^* \forall C_{in}$$

where $\forall$ represents the exclusive OR function.

* * * * *